April 15, 1952  O. E. FREDRICKSON  2,592,677
ANIMAL TRAP
Filed Oct. 11, 1949

INVENTOR.
OSCAR E. FREDRICKSON
BY
McMorrow, Berman & Davidson
ATTORNEYS

Patented Apr. 15, 1952

2,592,677

UNITED STATES PATENT OFFICE 2,592,677

ANIMAL TRAP

Oscar E. Fredrickson, Moose Pass,
Territory of Alaska

Application October 11, 1949, Serial No. 120,711

3 Claims. (Cl. 43—93)

My invention relates to improvements in animal traps of the spring-actuated-jaw type.

An important object of my invention is to provide a jaw trap for animals which will catch the animals more readily than other conventional traps, because of its tendency to maintain the animal's foot between the jaws after the trap is sprung, but before the jaws snap closed, rather than tending to eject the foot, as some traps do.

A further object is to provide a trap of the above-mentioned class which is easy and safe to set, and which is very sensitive to being sprung when set.

A further object is to provide an improved trap-setting mechanism in the nature of a simple attachment, which may be either incorporated in new traps or readily installed upon conventional ones.

A still further object is to provide an attachment for traps which is highly simplified, strong and durable, and cheap to manufacture.

Other objects and advantages of the invention will be apparent during the course of the following description.

In the accompanying drawings forming a part of this application, and in which like numerals are employed to designate like parts throughout the same:

Figure 1:
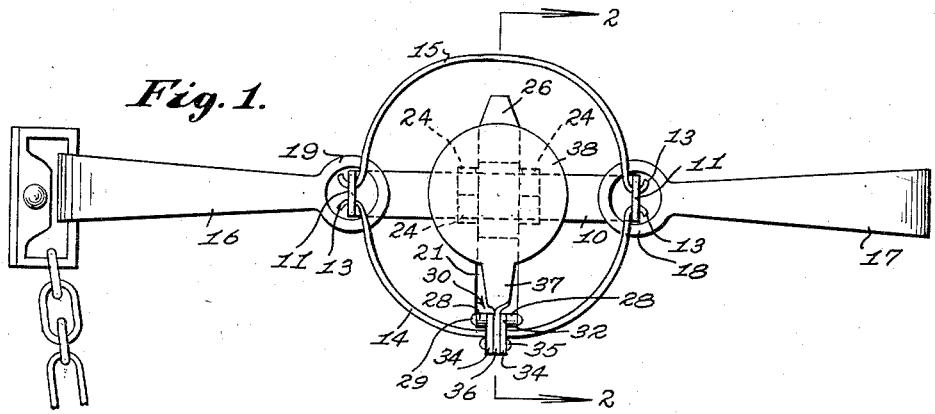
Figure 1 is a plan view of a set animal trap embodying my invention.

In the drawings, where, for the purpose of illustration, is shown a preferred embodiment of my invention, the numeral 10 designates a longitudinal base plate having upturned ends 11, each provided with a pair of apertures 12 in which trunnions 13 of a pair of jaws 14 and 15 are pivoted. The jaws 14 and 15, shown open or set in the drawings, are closed and held closed when the trap is sprung by the power of springs 16 and 17, which are bent upon themselves to form free ends provided with upper and lower rings or eyes 18 and 19, which respectively encircle the jaws and upturned ends 11 of the base plate when the trap is sprung. The construction thus far described is all conventional and well known.

The attachment embodying the invention is designated generally by the numeral 20 and comprises a flat unitary elongated strip or plate 21 having opposed, laterally- projecting extensions 22 near one end, and provided with longitudinal slit 23 forming laterally-oppositely-disposed pairs of tabs 24. The plate 21 is arranged in a plane parallel to and in contact with the base plate 10, the longitudinal axis of the plate 21 being perpendicular to the longitudinal axis of the plate 10, and the tabs 24 are bent upwardly upon lines 25, and over the top of the base plate 10, upon opposite sides of the same for securing the attachment to the base plate.

The usual cross-plate 26 may be provided, rigidly secured to the top of the base plate 10 by welding or the like. The cross-plate 26 is also disposed transversely of the base plate at the longitudinal center thereof, and directly above the plate 21 of the attachment. The cross-plate 26 engages between the tabs 24 after they are bent about the base plate 10 to positively secure the plate 21 against movement longitudinally of the base plate 10.

The plate 21 is provided in its outer end with a notch 27, and upturned hinge knuckles 28 upon opposite sides of the notch, which receive a pintle 29. An upstanding trigger plate 30 has a lower hingle knuckle 31 arranged between the knuckles 28 and pivotally receiving the pintle 29 for free vertical swinging movement. At its top end, the trigger plate 30 has an integral laterally-outwardly-extending horizontal arm or short extension 32, and the extension 32 and trigger plate 30 have a vertical clearance slot 33 extending entirely through the extension 32 and terminating near the vertical center of the trigger plate 30. The outer end of the horizontal extension 32 is rolled upwardly to provide hinge knuckles 34 upon opposite sides of the slot 33, and the knuckles 34 receive a pin 35.

Figure 3:
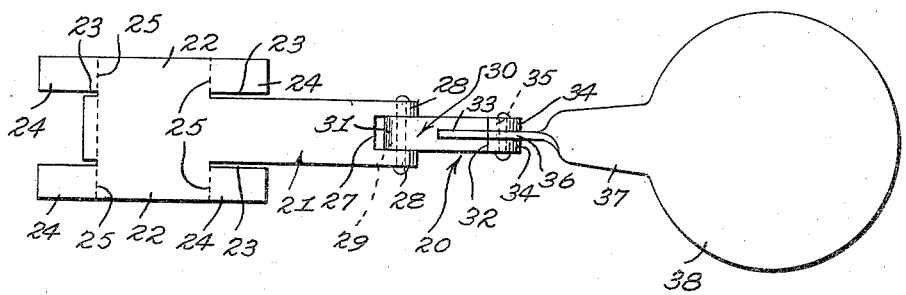
Figure 3 is a plan view of an attachment embodying the invention, and shown removed from the trap and in an extended position.

Freely pivotally mounted upon the pin 35 and operating between the knuckles 34 and within the slot 33 is an outer horizontal, vertically-disposed portion or extension 36 of a flat horizontal transverse arm 37 carrying the usual flat circular horizontal bait plate or pan 38. The pan 38 is normally disposed directly over the longitudinal center of the base plate 10, as shown. The pan 38 and arm 37 are adapted to swing vertically, and the whole attachment 20 may still be extended longitudinally, Figure 3, when attached to the base plate 10 of the trap.

Figure 2:
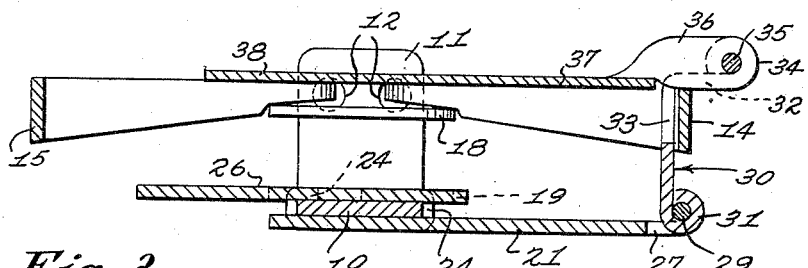
Figure 2 is an enlarged transverse vertical section taken on line 2—2 of Figure 1.

In setting the trap, the attachment 20 is first arranged generally as shown in Figure 2, but the trigger plate 30 is swung to the left of vertical, so that when the jaws are opened up, the jaw 14 may pass over the knuckles 34. When the jaws are opened to their full extent, the trigger plate 30 is swung to approximately the vertical, Figure 2, and the jaw 14 will engage beneath the outer end of the horizontal extension 32, as shown. The trigger plate 30 now holds the trap set until the animal touches the pan 38, and depresses it slightly when the trap will be sprung. The attachment 20 is very sensitive and will spring the jaws of the trap when the animal's foot presses lightly upon the pan.

Due to the construction of the attachment 20 in three pivotally-connected sections, it is more sensitive than most traps, having the pan and trigger formed integrally. Also, the pan 38 of my trap will never tend to expel the animal's foot at the instant the trap is sprung and before the jaws close. The pan 38 and arm 37 will drop instantly, due to their pivotal mounting, tending to further lower the animal's foot into the trap. Further, due to the construction of the attachment 20, I have found that my trap will not freeze up as readily in cold weather as conventional traps.

When applying my attachment 20 to an old or conventional trap, it is merely necessary to saw off the side of the cross-plate 26 having the conventional trigger and pan, and then apply my attachment 20, as shown and described.

When my attachment 20 is incorporated in new traps, I also contemplate making the plate 21 integral with the cross-plate 26.

It is to be understood that the form of the invention herewith shown and described is to be taken as a preferred example of the same, and that various changes in shape, size and arrangement of parts may be resorted to without departing from the spirit of my invention or the scope of the subjoined claims.

Having thus described my invention, I claim:

1. In an animal trap having cooperative relatively movable spring urged jaws, means releasably engaging one of said jaws for holding said jaws in a spaced set position against the spring urgement, said means comprising a supporting plate attachable to the base plate of the trap, a locking arm, a first pivot connecting one end of the arm to the plate for vertical swinging movement about a horizontal axis, an offset locking shoulder on the other end of the arm, said arm being adapted to be positioned perpendicular to the supporting plate and arranged within the jaws with the offset end vertically overlying the first pivot and engaged on a portion of one of said jaws, the engaged portion of the said jaw being in vertical alignment with the first pivot, a bait pan adapted to be substantially disposed in a horizontal plane and overlying the supporting plate, said bait pan having a vertical end extension disposed at right angles to the plate, a second pivot connecting said end flange to the offset end of the arm, said second pivot element lying in a vertical plane paralleling and disposed outwardly from the vertical plane of the first pivot, said bait pan upon depression under the weight of the paw of an animal causing the arm to swing inwardly about the pivot member relative to the supporting plate with the second pivot moved into vertical alignment with the first pivot and the engaged jaw portion camming over the offset end, and the arm and bait pan collapsing about both of the pivots.

2. In an animal trap having cooperative spring urged jaws relatively movable about horizontal axes, means releasably engaging one of said jaws for holding the jaws in a spread set position against the spring urgement, said means comprising a supporting plate attachable to the base plate of the trap and having an outer end, a locking arm, a first pivot connecting one end of the locking arm to the supporting plate for vertical swinging movement thereon, a laterally projecting locking shoulder formed on the other end of the arm, said arm being positionable in a vertical plane perpendicular to said supporting plate with the shoulder overlying and projecting outwardly beyond the pivot for engagement on a portion of one of said jaws, said shoulder and adjoining portion of the arm being formed with communicating axial slots, a bait pan adapted to be disposed in a horizontal plane paralleling and overlying the supporting plate and disposed between the jaws, an end extension formed on the bait pan and arranged at right angles to the pan, said flange being swingably disposed in the slots, a second pivot connecting the flange to the free end of the shoulder, said second pivot lying in a vertical plane outwardly from a vertical plane in which the first pivot lies and said second pivot being movable inwardly into vertical alignment with the first pivot upon inward movement of the bait pan and arm about the first pivot in reactive movement to the imposition of the paw of an animal on the bait pan.

3. In an animal trap having cooperative spring urged jaws relatively movable about horizontal axes, means releasably engaging one of said jaws for holding the jaws in a spread set position against the spring urgement, said means comprising a supporting plate attachable to the base plate of the trap and having an outer end, a locking arm, a first pivot connecting one end of the locking arm to the supporting plate, a laterally projecting locking shoulder formed on the other end of the arm, said arm being positionable in a vertical plane perpendicular to said supporting plate with the shoulder overlying and projecting outwardly beyond the first pivot for engagement on a portion of one of said jaws, said shoulder and adjoining portion of the arm being formed with communicating axial slots, a bait pan adapted to be disposed in a horizontal plane paralleling and overlying the supporting plate and disposed between the jaws, an end extension formed on the bait pan and arranged at right angles to the pan, said flange being swingably disposed in the slots, and having a bottom edge engageable with said jaw, upstanding hinge ears on the free end of the shoulder, a second pivot disposed in said ears and through the flange, said second pivot lying in a vertical plane outwardly from and parallel to a vertical plane in which the first pivot lies when the shoulder is engaged on the said jaw, and said second pivot moving into vertical alignment with the first pivot upon inward movement of the bait pan and arm about the first pivot in reactive movement to the weight of an animal paw on the pan, with the said jaw being slightly depressed and camming over the shoulder.

OSCAR E. FREDRICKSON.

REFERENCES CITED

The following references are of record in the file of this patent:

UNITED STATES PATENTS

| Number | Name | Date |
|---|---|---|
| 1,005,667 | Steffens | Oct. 10, 1911 |
| 1,256,973 | Bedard et al. | Feb. 19, 1918 |
| 1,393,516 | Elder | Oct. 11, 1921 |
| 1,563,772 | May | Dec. 1, 1925 |